Dec. 27, 1949   A. O. LUNDELL   2,492,387
VISCERA AND HEAD INSPECTION APPARATUS
Filed Oct. 23, 1948   3 Sheets-Sheet 1
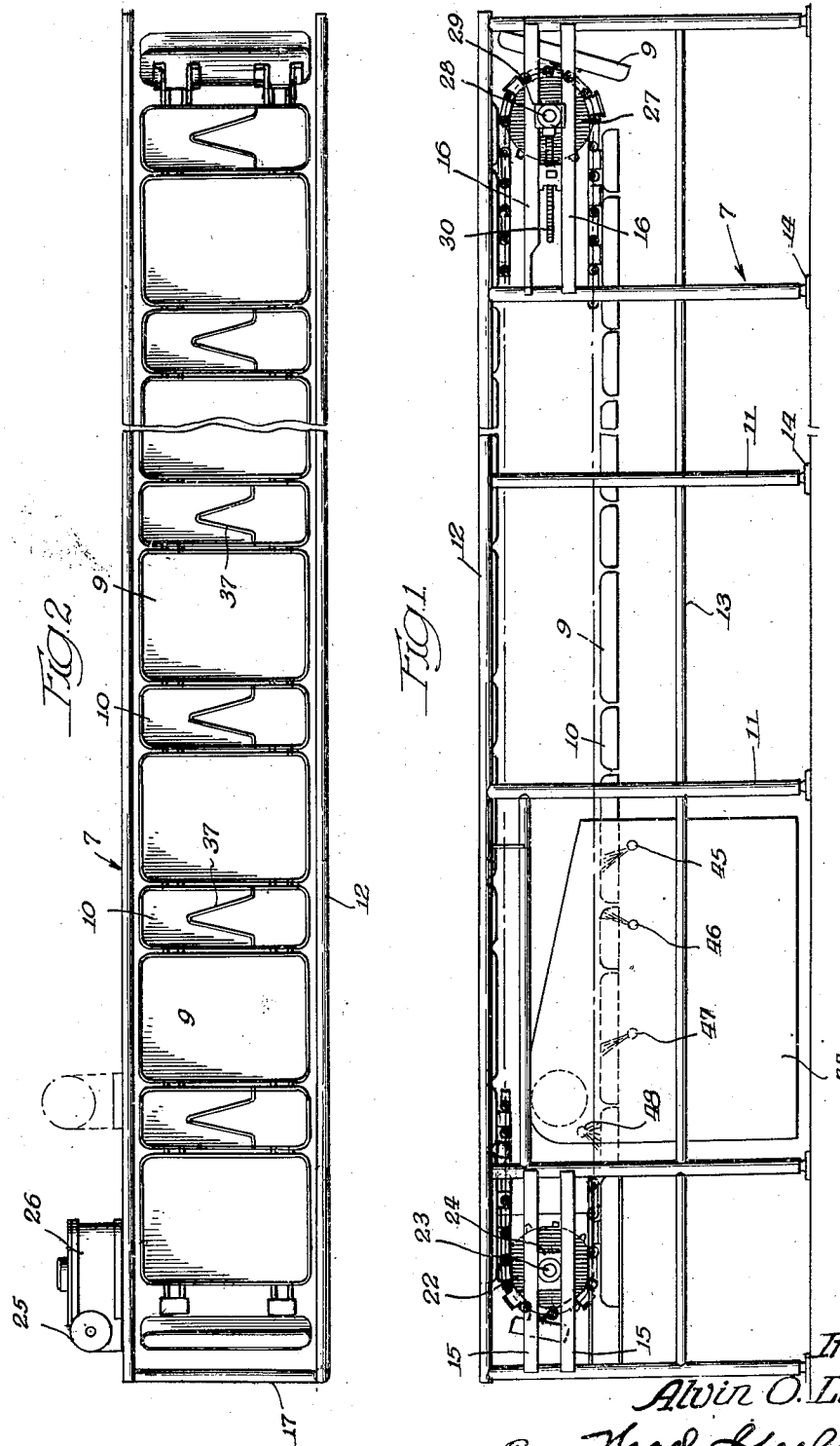
Inventor
Alvin O. Lundell
By: Fred Gerlach atty Dec. 27, 1949     A. O. LUNDELL     2,492,387
VISCERA AND HEAD INSPECTION APPARATUS
Filed Oct. 23, 1948     3 Sheets-Sheet 2
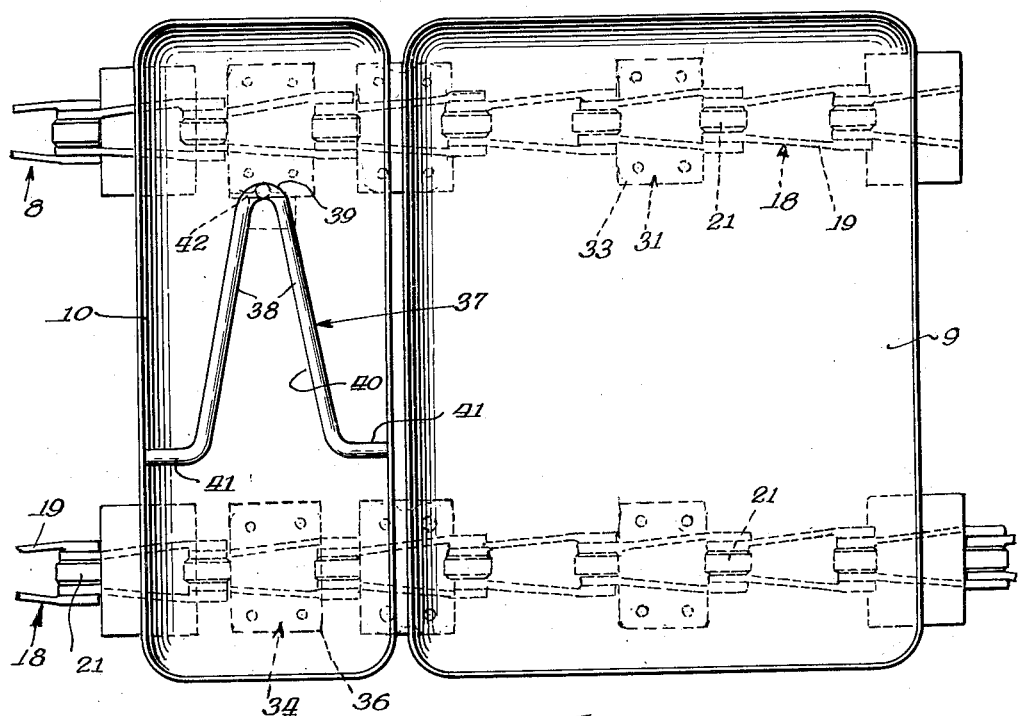
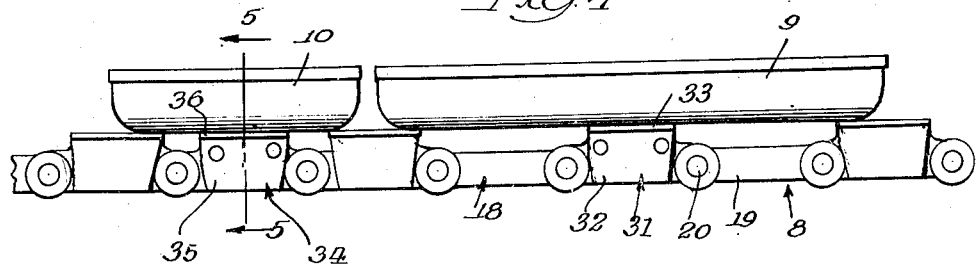
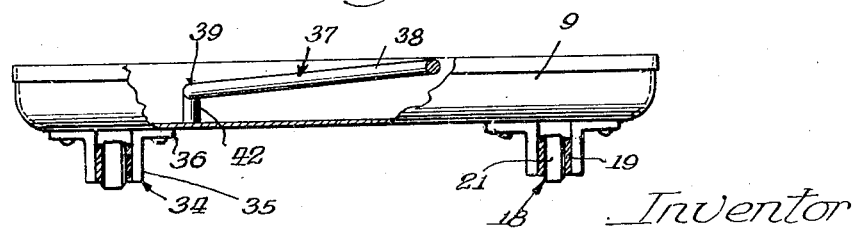
Inventor
Alvin O. Lundell
By Fred Gerlach atty Dec. 27, 1949 A. O. LUNDELL 2,492,387
VISCERA AND HEAD INSPECTION APPARATUS
Filed Oct. 23, 1948 3 Sheets-Sheet 3

Inventor
Alvin O. Lundell
By: Fred Gerlach atty

Patented Dec. 27, 1949

2,492,387

UNITED STATES PATENT OFFICE 2,492,387

VISCERA AND HEAD INSPECTION APPARATUS

Alvin O. Lundell, Chicago, Ill., assignor to The Allbright-Nell Company, Chicago, Ill., a corporation of Illinois Application October 23, 1948, Serial No. 56,236

5 Claims. (Cl. 17—1)

The present invention relates to apparatus for use in connection with inspection of the viscera and heads of certain animal carcasses.

In commercial slaughtering and packing houses it is standard practice to inspect the viscera and heads of hog and calf carcasses. The inspection is carried out by qualified inspectors under government supervision and is for the purpose of determining whether any carcass is diseased or contaminated and hence not useable for human consumption. According to current practice trolley equipped gambrels are applied to the hind feet of the carcasses directly after the slaughtering and other preliminary conditioning operations. After application of the gambrels the trolleys are successively mounted on an overhead rail which has associated with it power driven mechanism for moving the gambrel suspended carcasses along the rail for treatment at different stations or locations. At one station along the overhead rail is an inspection table of the type that comprises a moving top in the form of a horizontal series of pans. The pans are moved in synchronism with the carcasses and are arranged so that there is one pan adjacent each carcass. Before the carcasses reach the table the bellies are slit open and the heads are partially or completely severed adjacent the cervical or neck regions. When each carcass reaches the table the viscera is removed and placed on the opposite pan of the table for purposes of inspection. The cervical lymphatic glands in the heads of the carcasses are inspected to determine whether tuberculosis or other disease is present. In connection with inspection of the heads the inspectors by way of suitable knives cut into the lymphatic glands. Heretofore inspection of the heads has been accomplished by several different methods. One method involves inspecting the heads after they are partially severed and before the carcasses reach the moving top viscera inspection table where the viscera is removed and placed on the pans for inspection purposes. The second method involves inspecting the heads after they are completely severed from the neck portions of the carcasses and while they are mounted on hooks which are disposed between and move along with the carcasses. The third method involves inspecting the heads after they are completely severed from the neck portions of the carcasses and while they are positioned on the pans of the inspection table with their respective viscera. All of these methods have proved in practice to be objectionable. The first mentioned method is subject to the objection that the heads while partially severed from the neck portions of the carcasses hang in such a position that the lymphatic glands in the cervical regions are not readily accessible to the inspectors. It is also subject to the objection that if the rate of slaughter is fast two inspectors are required or if the rate of slaughter is slow (150 an hour or less) the one inspector whom the Government authorizes has difficulty in inspecting both heads and viscera. The second method is objectionable for the same reason and the further reason that it is necessary to wash and sterilize the hooks after each use. The third method is subject to the objection that the heads, if infected, are likely to infect uninfected viscera on the same pans or, if not infected, are likely to become infected by infected viscera on the pans.

The primary or principal object of this invention is to provide a viscera and head inspection apparatus which is an improvement upon previously designed apparatus and when in use involves a method of inspecting the viscera and heads of hog and calf carcasses which eliminates the objections to, and disadvantages of, heretofore employed inspection methods. In general the improved apparatus is of the so-called moving top variety or type and comprises an elongated frame structure with pairs of vertically extending sprocket wheels at its ends and mechanism for driving one pair of sprocket wheels, a pair of parallel, spaced apart chains extending around the sprocket wheels and having upper and lower horizontal reaches, a series of equidistantly spaced large sized pans which extend between, and are connected to, the two chains and are adapted when travelling in the upper reaches of the chains individually to retain the viscera from the carcasses on the adjacent portions of the overhead rail, and a series of equidistantly spaced, small sized pans which extend between, and are connected to, the two chains, are positioned or disposed between the large sized viscera retaining pans, and are adapted to support for inspection purposes the heads which belong to the viscera on the adjoining large sized pans. By employing separate small sized head retaining pans in addition to the large sized viscera retaining pans the heads may be readily inspected independently of the viscera and are segregated from their respective viscera to the end that they can not contaminate their respective viscera or be contaminated by the latter. Another advantage of the apparatus is that a single inspector need only be employed even though the rate of slaughter is 150 per hour or more.

Another object of the invention is to provide a viscera and head inspection apparatus of the type and character set forth in which the small sized pans which are arranged in alternate relation with the large sized viscera retaining pans are provided with means for holding the heads in the most accessible and advantageous position for inspection of the cervical lymphatic glands.

A further object of the invention is to provide a viscera and head inspection apparatus of the last mentioned character in which the head holding means on the small sized pans are so constructed and arranged that the nose and upper skull portions face downwards and rest directly on the small sized pans.

A still further object of the invention is to provide a viscera and head inspection apparatus which is generally of new and improved construction, effectively and efficiently fulfills its intended purpose and facilitates and expedites inspection of the viscera and heads.

Other objects of the invention and the various advantages and characteristics of the present viscera and head inspection apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a side elevation of a viscera and head inspection apparatus embodying the invention;

Figure 2 is a plan view illustrating in detail the arrangement of the large sized viscera retaining pans and the small sized head retaining pans;

Figure 3 is an enlarged plan view of one of the large sized viscera retaining pans and the following small sized pan for retaining the head that belongs with the viscera on the large sized pan;

Figure 4 is a side elevation of the two pans that are illustrated in Figure 3;

Figure 6:
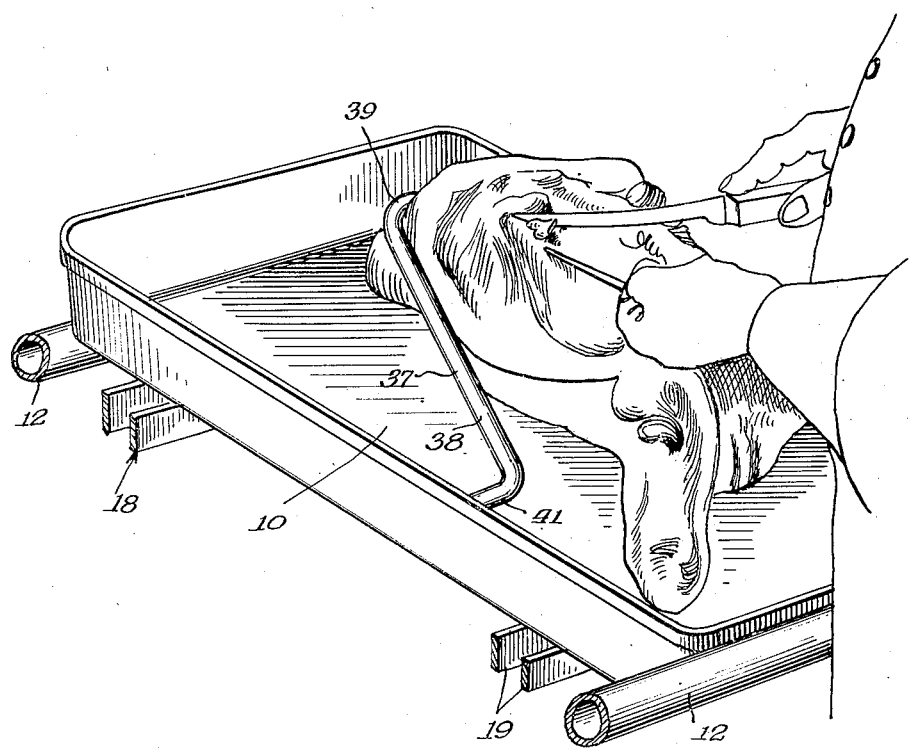

Figure 5 is a vertical transverse section taken on the line 5—5 of Figure 4 and showing the manner in which the small sized head retaining pans are connected to the parallel spaced apart roller chains, certain parts being shown in elevation for purposes of clarity; and Figure 6 is a perspective of one of the small sized head retaining pans, illustrating the construction and mode of operation of the head holding means.

The apparatus which is illustrated in the drawings constitutes the preferred form or embodiment of the invention and is for use in a commercial slaughtering or packing house. Its purpose is to retain the viscera and heads of either hog or calf carcasses in connection with governmental inspection thereof. As its principal components or parts the apparatus comprises a horizontally elongated frame structure 7, an endless conveyor 8, an endless series of equidistantly spaced large sized pans 9 on the conveyor, and a series of equidistantly spaced small sized pans 10 between the large sized pans 9. It is contemplated that the apparatus will be placed adjacent to, and in parallel relation with, a portion of an overhead rail along which carcasses to be inspected and processed are continuously moved by way of power driven mechanism which is associated with the rail. It is also contemplated that the bellies of the carcasses will be slit longitudinally before the carcasses reach the appartus. As well understood in the art, after the animals are slaughtered and treated in a preliminary manner trolley equipped gambrels are applied to the hind feet of the carcasses. After application of the gambrels the trolleys are mounted on the aforementioned overhead rail and are propelled by the power driven mechanism continuously along the rail. As viewed in Figures 1 and 2 the left hand end of the apparatus is the receiving end and the right hand end is the discharge end. The carcasses, the viscera and heads of which are to be inspected, move from left to right lengthwise of the table.

The frame structure 7 of the apparatus is fabricated from heavy stiff tubing and comprises a pair of similarly formed parallel, laterally spaced, frame-like sides. Each of the sides consists of a longitudinal series of uprights 11, a longitudinally extending member 12 at the upper ends of the uprights and longitudinally extending members 13 between the central portions of the uprights. The lower ends of the uprights 11 are provided with floor-engaging feet 14. The longitudinally extending members 12 of the two sides of the frame structure are welded to the upper ends of the uprights and the ends of the longitudinally extending member 13 are welded to the central portions of the uprights. Below the left hand ends of the longitudinally extending member 12 are upper and lower longitudinally extending bars 15 and these are spaced vertically apart and have the ends thereof welded to the upper portions of the adjacent uprights 11. Beneath the right hand ends of the longitudinally extending member 12 are upper and lower longitudinally extending bars 16 and these, like the bars 15, are spaced vertically apart and have the ends thereof welded to the upper portions of the adjacent uprights. The two side frames of the horizontally elongated supporting structure 7 are cross connected by horizontally and transversely extending members 17. The latter have the ends thereof welded to certain of the uprights 11 and serve to hold the side frames of the supporting structure in fixed, spaced apart relation. The supporting structure 7, due to its construction, is rigid.

The endless conveyor 8 consists of a pair of parallel, spaced apart endless roller chains 18 and these are located between, and extend lengthwise of, the upper portions of the side frames of the supporting structure and embody straight, longitudinally extending horizontal upper reaches and straight, longitudinally extending horizontal lower reaches. Each of the chains is of standard or conventional design and consists of pairs of laterally spaced links 19, pivot pins 20 between the ends of the links and rollers 21 on the central portions of the pivot pins. The left hand ends of the chains extend part way around, and are supported by, two spaced apart sprocket wheels 22 which are fixedly mounted on a horizontally extending shaft 23 at the receiving end of the supporting structure. The ends of the shaft 23 are journalled in bearing blocks 24 and these extend between, and are fixedly secured to, the central portions of the upper and lower bars 15. An electric motor 25 and a speed reducing gear variety unit 26 serve to drive the chains 18 so that they move continuously in a clockwise direction as viewed in Figure 1 of the drawings. The motor 25 is connected to drive the drive shaft of the unit 26. The latter is suitably mounted on the left-hand end of one of the side frames of the supporting structure and embodies a driven shaft (not shown) which is operatively connected to one end of the shaft 23 to which the sprocket wheels 22 are fixedly connected. The right hand ends of the chains 18 are trained part way around a pair of laterally spaced sprocket wheels 27 and these are fixedly secured to a transversely extending horizontal shaft 28. The ends of this shaft are journalled in bearing blocks 29 which fit slidably between the central portions of the upper and lower bars 16 and have applied thereto screw shafts 30 for sliding the bearing blocks 29 so as to take up slack in the endless roller chains 18. It is contemplated that the motor 25 and the speed reducing unit 26 will drive the conveyor 8 consisting of the two spaced apart endless roller chains 18 so that its speed corresponds to, or is the same as, the speed at which the carcasses are moved along the aforementioned overhead rail.

The large sized pans 9 extend between, and are connected to, the chains 18 constituting the endless conveyor 8 and serve individually to retain the viscera after removal thereof from the carcasses. They are substantially rectangular and have continuous upstanding rims at their margins. Preferably the pans 9 are formed of stainless steel. The central outer portions of the pans are connected to the chains 18 by way of pairs of angle bar type brackets 31. The latter consist of legs 32 and legs 33. The legs 32 are riveted or otherwise fixedly secured to certain of the links 19 of the chains 18 and the legs 33 extend at right angles to the legs 32 and are spot welded or otherwise fixedly secured to the outer central portions of the pans. As previously pointed out, the pans are spaced equidistantly apart around the endless conveyor 8. It is contemplated that as soon as a carcass with a slit belly reaches the receiving end of the supporting structure the viscera will be removed from the carcass and placed on the large pan 9 which is on the upper reach of the conveyor and is directly opposite the carcass. As the carcass and pan travel together in the direction of the discharge end of the supporting structure the viscera is inspected. If it is found that the viscera is contaminated the viscera is permitted to be discharged into a suitable receptacle (not shown) when the pan on which the viscera is retained passes around the sprocket wheels 27 at the discharge end of the supporting structure. If the viscera on a large sized pan 9 is not contaminated it is removed from the pan as the latter reaches the discharge end of the supporting structure and then placed on a separate table for further processing. The large sized pans 9 for individually retaining the viscera are preferably 24 inches wide. They are spaced apart a distance slightly greater than 12 inches.

The small sized pans 10 extend between, and are connected to, the conveyor forming chains 18 and are positioned between the large sized pans 9. They are preferably formed of stainless steel and serve to retain the heads which belong to the viscera on the preceding large sized pans 9. As shown in the drawings, the small sized head retaining pans 10 have continuous upturned rims at their margins. The central outer portions of the pans 10 are connected to the chains 18 by way of angle bar type brackets 34. The latter consist of legs 35 and legs 36. The legs 35 extend vertically and are riveted or otherwise fixedly secured to certain of the links 19 of the chains 18. The other legs of the brackets 34, i.e., the legs 36, extend at right angles to the legs 35 and are spot welded or otherwise fixedly secured to the central outer portions of the head retaining pans 10. It is contemplated in connection with use of the apparatus that after the viscera has been removed from a carcass and placed on its proper large sized pan 9 the head of the carcass will be completely severed adjacent the cervical or neck region and placed on the pan 10 that directly follows the large sized pan on which the viscera belonging to the head was previously placed. As the small sized pan with the head travels in the upper reach of the endless conveyor the cervical lymphatic glands are inspected to determine whether tuberculosis or other disease is present. By employing the individual small sized pans 10 which are in alternating relation with the large sized viscera retaining pans 9 the heads of the carcasses are segregated from their respective viscera and hence they can not, if diseased, contaminate their viscera or, if not diseased, be contaminated by their viscera. In practice it has been found that the heads on the small sized pans 10 may be most readily and advantageously inspected when they are positioned so that the nose and upper skull portions face downwards and rest on the central portions of the pans 10. When so positioned the cervical lymphatic glands face upwards and outwards and may be readily cut by the inspector in connection with inspection thereof. In order properly to hold the heads on the small sized pans 10 head holders 37 are provided. These holders are shown in the drawings as being formed of heavy gauge wire. They are generally V-shaped in configuration and each comprises a pair of forwardly divergent side members 38 and a U-shaped connecting member 39 between the rear ends of the side members 38. The side members 38 of the holders define between them V-shaped spaces 40 for slidably receiving the nose portions of the heads. As best shown in Figure 5, the side members 38 are spaced an appreciable distance above the pans and are inclined slightly downwards in the direction of their rear ends. The front ends of the side members 38 are bent outwards to form lateral extensions 41, the outer ends of which abut against, and are welded to, the upper portions of the side parts of the rims of the pans 10. The rear ends of the side members 38 are supported in spaced relation with the pans by way of wire posts 42 which extend between, and are welded to, the U-shaped connecting members 39 of the holders and the adjacent portions of the pans 10. The heads of the carcasses are mounted on the pans 10 by first positioning them directly in front of the holders with the nose and upper skull portions facing downwards and the noses facing in the direction of the holders. Thereafter the heads are shifted bodily forwards in order to bring the nose portions into firm engagement with the forwardly divergent side member 38. When the heads are in place they are held by the holders against forward and sidewise displacement and are arranged so that the nose and upper skull portions face downwards and rest directly on the central portions of the pans 10. To remove the heads it is only necessary to slide them bodily forwards as to bring them out of the V-shaped spaces 40. As heretofore indicated, when the heads are held in place by the holders 37 the cervical lymphatic glands face upwards and forwards and are readily accessible for inspection. As shown in the drawings the small sized head retaining pans 10 are approximately one-half as wide as the viscera retaining pans 9. The inspector, in connection with inspection of the viscera and heads which are disposed respectively on the large and small sized pans, may stand on either side of the table. For example, he may stand as shown in Figure 6 of the drawings. Preferably, however, the inspector stands on the opposite side of the table in order that when he cuts the cervical lymphatic glands the force resulting from the cutting operation does not dislodge the head being inspected from its holder 37.

In addition to the parts heretofore described the apparatus comprises a unit for washing, sterilizing and cooling the pans 9 and 10 during travel thereof in the lower reach of the endless conveyor 8. As shown in Figure 1 this unit is located beneath the receiving end of the supporting structure 7 and consists of a housing 44 which surrounds the adjacent portion of the lower reach of the conveyor. Within the housing are four horizontally and transversely extending spray pipes 45, 46, 47 and 48. The spray pipe 45 is located beneath the lower reach of the conveyor. It is connected to a suitable source of cold water under pressure and serves to jet streams of cold water upwards onto the pans in order to wash blood and other matter therefrom. The spray pipes 46 and 47 follow and are horizontally aligned with the cold water spray pipe 45 and are connected to a suitable source of hot water under pressure. They serve to jet streams of hot water upwards onto the trays on the lower reach of the conveyor in order to sterilize the pans. The pipe 48 is positioned directly over the lower reach of the conveyor and follows the pipe 47. It is connected to a suitable source of cold water under pressure and serves to jet cold water downwards onto the pans 9 and 10 in order to cool them after they are sterilized by the streams of hot water emanating from the hot water supply spray pipes 46 and 47.

In connection with operation of the apparatus the pans 9 and 10 when in the upper reach of the conveyor travel in synchronism with the carcasses on the portion of the overhead rail adjacent which the apparatus is disposed. As soon as a carcass reaches the receiving end of the supporting structure the viscera is removed and placed on the large sized pan 9 that is in opposed relation with it. Immediately thereafter the head of the carcass is severed at the cervical or neck region and is mounted on the next following small sized pan 10. In connection with mounting of the head on such pan it is inverted and slid rearwards into connected relation with the holder on the small sized pan. As the viscera and the respective heads therefor move along the upper reach the endless conveyor from the receiving end of the supporting structure to the discharge end they are inspected for disease or contamination.

The herein described viscera and head inspection apparatus effectively and efficiently fulfills its intended purpose and is characterized by the fact that the heads, when mounted on the small sized pans 10 are segregated from their respective viscera and are so positioned or maintained in place so that the cervical lymphatic glands are readily accessible for inspection. It facilitates and expedites inspection of the viscera and heads. In addition, it involves less labor so far as inspection of the viscera and heads is concerned and permits knife work on the viscera and heads to be carried out under extremely safe conditions.

The invention is not to be understood as restricted to the details set forth since these may be modified within the scope of the appended claims without departing from the spirit and scope of the invention.

Having thus described the invention, what I claim as new and desire to secure by Letters Patent is:

1. An apparatus adapted for use in connection with inspection of the viscera and heads of animal carcasses and comprising an elongated supporting structure, an endless conveyor mounted on the supporting structure so that it has a longitudinally extending horizontal upper reach, and provided with power means for driving it in one direction, a series of equidistantly spaced large sized one-piece pans provided with continuous upstanding rims, connected to, and extending around, the conveyor and adapted when travelling on the upper reach of the conveyor individually to retain the viscera from the carcasses, and a series of equidistantly spaced small sized one-piece pans provided with continuous upstanding rims, connected to the conveyor so that they are positioned between the large sized pans, adapted when travelling on said upper reach of said conveyor individually to retain the heads belonging to the viscera on the adjacent large sized pans, said small sized pans having operatively associated therewith means for releasably holding the heads so that their nose and upper skull portions face downward and rest directly on said central portions of the small sized pans.

2. An apparatus adapted for use in connection with inspection of the viscera and heads of animal carcasses and comprising an elongated supporting structure, an endless conveyor mounted on the supporting structure so that it has a longitudinally extending horizontal upper reach, and provided with power means for driving it in one direction, a series of spaced apart, flat, one-piece pans connected to, and extending around, the conveyor and adapted when travelling on the upper reach individually to retain the viscera from the carcasses, and a series of spaced apart, flat, one-piece pans connected to the conveyor so that they are positioned between the first mentioned pans adapted when travelling on said upper reach individually to retain the heads belonging to the viscera on the adjacent first mentioned pans, said small sized pans having operatively associated therewith holders for releasably retaining the heads so that the nose and upper skull portions face downward and rest directly on the central portions of the second mentioned pans.

3. An apparatus adapted for use in connection with inspection of the viscera and heads of animal carcasses and comprising an elongated supporting structure, an endless conveyor mounted on the supporting structure so that it has a longitudinally extending horizontal upper reach, and provided with power means for driving it in one direction, a series of equidistantly spaced large sized pans, connected to, and extending around, the conveyor and adapted when travelling on the upper reach of the conveyor individually to retain the viscera from the carcasses, and a series of equidistantly spaced small sized pans connected to the conveyor so that they are positioned between the large sized pans, adapted when travelling on said upper reach of the conveyor individually to retain the heads belonging to the viscera on the adjacent large sized pan, and embodying over the central portions of the small sized pans elevated V-shaped holders for releasably holding the heads so that the nose and upper skull portions face downwards.

4. An apparatus adapted for use in connection with inspection of the viscera and heads of animal carcasses and comprising an elongated supporting structure, an endless conveyor mounted on the supporting structure so that it has a longitudinally extending horizontal upper reach, and provided with power means for driving it in one direction, a series of spaced apart pans connected to, and extending around, the conveyor and adapted when travelling on said reach individually to retain the viscera from the carcasses, and a series of spaced apart pans connected to the conveyor so that they are positioned between the first mentioned pans, adapted when travelling on said upper reach individually to retain the heads belonging to the viscera on the adjacent first mentioned pans, and provided adjacent the central portions thereof with V-shaped holders for releasably holding the heads so that the nose and upper skull portions face downwards.

5. An apparatus adapted for use in connection with inpection of the viscera and heads of animal carcasses, and comprising an elongated supporting structure, a horizontal series of large sized pans movably mounted on the supporting structure and adapted individually to retain the viscera from the carcasses, and a corresponding series of small sized pans movably mounted on the supporting structure, positioned in associated relation with the large sized pans, respectively, adapted individually to retain the heads belonging to the viscera on the adjacent large sized pans, and provided adjacent the central portions thereof with V-shaped holders for releasably holding the heads so that the nose and upper skull portions face downwards.

ALVIN O. LUNDELL.

REFERENCES CITED

The following references are of record in the file of this patent:

UNITED STATES PATENTS

| Number | Name | Date |
| --- | --- | --- |
| Re. 16,079 | Lundell | May 19, 1925 |
| 1,537,846 | McKenzie | May 12, 1925 |